US010289850B2

United States Patent
Parker et al.

(10) Patent No.: US 10,289,850 B2
(45) Date of Patent: May 14, 2019

(54) ACCESSING SUPERVISOR PASSWORD VIA KEY PRESS

(71) Applicant: LENOVO (Singapore) PTE. LTD., New Tech Park (SG)

(72) Inventors: Joseph Robert Parker, Hillsborough, NC (US); Mikio Hagiwara, Yamato (JP); James Patrick Hoff, Raleigh, NC (US); Eitaroh Kasamatsu, Kawasaki (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 209 days.

(21) Appl. No.: 15/080,887

(22) Filed: Mar. 25, 2016

(65) Prior Publication Data

US 2017/0277896 A1    Sep. 28, 2017

(51) Int. Cl.
*G06F 21/31*  (2013.01)
*G06F 21/57*  (2013.01)
*G06F 21/60*  (2013.01)
*G06F 3/0488* (2013.01)

(52) U.S. Cl.
CPC ........ *G06F 21/575* (2013.01); *G06F 3/04883* (2013.01); *G06F 21/31* (2013.01); *G06F 21/604* (2013.01)

(58) Field of Classification Search
CPC .......................... G06F 21/575; G06F 3/04883
See application file for complete search history.

(56) References Cited

U.S. PATENT DOCUMENTS

2005/0081071 A1* 4/2005 Huang .................... G06F 21/81
713/300

* cited by examiner

*Primary Examiner* — Oleg Korsak
(74) *Attorney, Agent, or Firm* — Kunzler Bean & Adamson

(57) ABSTRACT

For supervisor password access based on a key press of a hotkey, systems, apparatus, methods, and program products are disclosed. The apparatus may include a processor that monitors for a key press of a hotkey during a up process, that detects a supervisor password access attempt, that allows access to the supervisor password in response to hotkey being pressed during the boot up process, and that denies access to the supervisor password in response to hotkey not being pressed during the boot up process.

16 Claims, 6 Drawing Sheets

ACCESSING SUPERVISOR PASSWORD VIA KEY PRESS

BACKGROUND

Field

The subject matter disclosed herein relates to setting a supervisor password and more particularly relates to accessing a supervisor password via key press.

Description of the Related Art

Due to security concerns, setting the supervisor password for BIOS/UEFI access typically requires physical presence of a user, such as a system administrator. Thus, the supervisor password can only be set through manual physical input on the target device. However, in a large enterprise where hundreds or even thousands of devices need to be deployed with a supervisor password, it is impractical to physically set the password on each device.

BRIEF SUMMARY

An apparatus for securely setting supervisor password during automated deployment is disclosed. A method and computer program product also perform the functions of the apparatus.

The apparatus may include an input device that receives a keypress, a processor, and a memory that stores code executable by the processor, the code causing the processor to monitor for a keypress hotkey during a boot up process, detects a supervisor password access attempt, allow access to the supervisor password in response to hotkey being pressed during the boot up process, and deny access to the supervisor password in response to hotkey not being pressed during the boot up process.

In some embodiments, the processor may further set a protection flag in response to a power-up event. In further embodiments, the processor may reset the protection flag in response to hotkey being pressed during the boot up process. In one embodiment, the processor allowing access to the supervisor password (in response to the hotkey being pressed during the boot up process) includes the processor determining whether the protection flag is reset and permitting access to the supervisor password in response to the protection flag being reset. In another embodiment, the processor denying access to the supervisor password (in response to the hotkey not being pressed during the boot up process) includes the processor determining whether the protection flag is set and preventing access to the supervisor password in response to the protection flag being set.

In certain embodiments, the processor further activates the deployment mode in response to detecting the hotkey press, wherein the deployment mode permits an automated script to set the supervisor password. In further embodiments, the processor allowing access to the supervisor password (in response to hotkey press during the boot up process) includes the processor determining whether the deployment mode is activated and permitting access to the supervisor password in response to deployment mode being activated. In some embodiments, the processor further initiates a timer in response to a power-up event, wherein the processor monitoring for a keypress of the hotkey during the boot up process includes the processor monitoring for a hotkey press while the timer is active and ignoring a hotkey press in response to expiration of the timer. In certain embodiments, the hotkey press includes at least two key presses.

The method may include monitoring, by use of a processor, for a keypress hotkey during a boot up process, detecting a supervisor password access attempt, allowing access to the supervisor password in response to hotkey being pressed during the boot up process, and denying access to the supervisor password in response to the hotkey not being pressed during the boot up process.

In certain embodiments, the method also includes setting a protection flag in response to a power-up event and resetting the protection flag in response to the hotkey being pressed during the boot up process. In one embodiment, allowing access to the supervisor password in response to the hotkey being press during the boot process includes determining whether the protection flag is reset and permitting access to the supervisor password in response to the protection flag being reset. In another embodiment, denying access to the supervisor password in response to the hotkey not being oppressed during the boot up process includes determining whether the protection flag is set and denying access to the supervisor password in response to the protection flag being set.

In some embodiments, the method includes activating a deployment mode in response to detecting the hotkey press, the deployment mode permitting an automated script to set the supervisor password. In one embodiment, allowing access to the supervisor password in response to the hotkey being oppressed during the boot up process includes determining whether the deployment mode is activated and permitting access to the supervisor password in response to the deployment mode being activated. In certain embodiments, the method may include initiating a timer in response to a power-up event, wherein monitoring for a keypress of the hotkey during a boot up process includes ignoring a hotkey press in response to expiration of the timer.

The computer program product includes a computer readable storage medium that stores code executable by a processor, the executable code including code to perform: monitoring for a keypress of the hotkey during a boot up process, detecting a supervisor password access attempt, allowing access of the supervisor password in response to the hotkey being pressed during the boot up process, and denying access to the supervisor password in response to hotkey not being pressed during the boot up process.

In certain embodiments, the executable code includes code to perform: setting a protection flag in response to a power-up event, wherein denying access to the supervisor password in response to the hotkey not being pressed during the boot up process includes preventing access to the supervisor password in response to the protection flag being set. In further embodiments, the executable code includes code to perform: resetting the protection flag in response to the hotkey being pressed, wherein allowing access to the supervisor password in response to the hotkey being pressed during the boot up process includes permitting access to the supervisor password in response to the protection flag being reset.

In some embodiments, the executable code includes code to perform: activating a deployment mode in response to detecting the hotkey press, the deployment mode permitting an automated script to set up the supervisor password, wherein allowing access to the supervisor password in response to a hotkey press during the boot up process includes permitting access to the supervisor password in response to the deployment mode being activated. In certain embodiments, the executable code includes code to perform: initiating a timer in response to a power-up event, wherein monitoring for a keypress of the hotkey during a boot up process includes ignoring a hotkey press in response to expiration of the timer.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
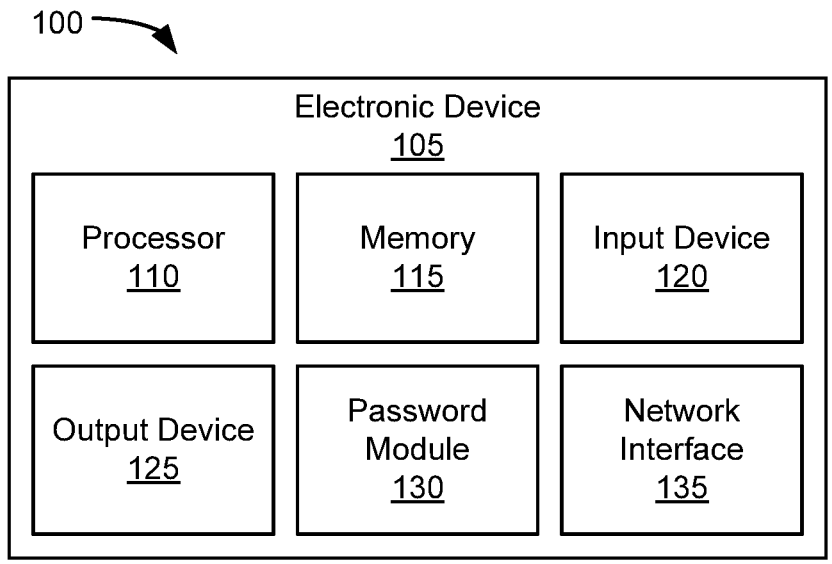
FIG. 1 is a schematic block diagram illustrating one embodiment of a system for securely setting supervisor password during automated deployment.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatus, method, and program products described herein securely set a supervisor password during automated deployments when one does not already exist. A supervisor password, as used herein, is a firmware-level password governing access to the boot up process and/or settings associated with the boot process for a computing device. For example, the supervisor password may control access to a BIOS/UEFI utility of the computing device. As another example, the supervisor password may control access to a boot up process of the computing device. A supervisor password may also be known as a "master password" a "startup password," or a "boot password." Examples of a supervisor password include, but are not limited to, a BIOS password, a UEFI password, a startup password, a boot password, and a power-on password.

The disclosed embodiments monitor for a key press of a hotkey during a boot up process and grant access to a supervisor password only in response to the hotkey being pressed during the boot up process. In some embodiments, the disclosed embodiments activate a unique boot mode in response to a user pressing the hotkey during the boot up process. While in this boot mode, security settings for the supervisor password are temporarily relaxed until the next boot cycle. Because the hotkey is only effective during the boot up process (e.g., only effective at power-on), detecting the key press of the hotkey shows physical presence and an intent to set a supervisor password. While in this unique boot mode, automated scripts may be used within a deployment process to set the supervisor password. Accordingly, the disclosed embodiments allow a large enterprise for to efficiently set a supervisor password without degrading security, thereby saving time and effort of the system administrator deploying computing devices for the large enterprise.

FIG. 1 is a schematic block diagram illustrating a system 100 for securely setting supervisor password during automated deployment. The system 100 comprises an electronic device 105. In one embodiment, the electronic device 105 includes a processor 110, a memory 115, a password module 130, an input device 120, and an output device 125. The electronic device 105 is configured to set a supervisor password which controls access to a BIOS, UEFI, or similar firmware interface. The supervisor password protects the electronic device 105 from unauthorized access to the BIOS, UEFI, or similar firmware interface.

The electronic device 105 may be any digital device capable of executing computing processes using a microprocessor, microcontroller, or other processing device, including, but not limited to, a general-purpose computing device, a special-purpose (dedicated) computing device, and the like. In some embodiments, the electronic device 105 may be a personal computer, including, but not limited to, a mobile phone, a smart phone, a tablet computer, a laptop computer, a handheld computer, a wearable computer, a gaming console, or the like.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In certain embodiments, the processor 110 may include a plurality of processing units, such as a plurality processing cores, a plurality of CPUs, a plurality of microcontrollers, or the like. In some embodiments, the processor 110 executes instructions stored in the memory 115 to perform the methods and routines described herein. The processor 110 is communicatively coupled to the memory 115, the input device 120, the output device 125, and the password module 130.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores additional data relating to securely setting supervisor password during automated deployment. For example, the memory 115 may store a protection flag, a current startup mode, and the like. In some embodiments, the memory 115 also stores program code and related data, such as a BIOS, UEFI, or similar firmware interface. The memory 15 may also store program code and related data for an operating system or other controller algorithms operating on the electronic device 105.

The input device 120, in one embodiment, may comprise any known computer input device including a touch panel, a button, a keyboard, and the like. The input device 120 is configured to receive input from a user, for example touch input, key press input, and the like. In certain embodiments, the input device 120 may include a microphone or other suitable device for receiving voice input from the user. For example, the user may speak one or more commands, wherein input device 120 receives the one or more commands as voice input.

In one embodiment, the input device 120 includes a touch-sensitive portion, such as a touch-sensitive input panel, configured to receive touch input from the user, such as an input gesture. In some embodiments, at least the touch-sensitive portion of the input device 120 may be integrated with the output device 125, for instance as a touchscreen or similar touch-sensitive display.

The output device 125, in one embodiment, may comprise any known electronic display capable of outputting visual data to a user. As used herein, the output device 125 refers to a physical, electronic display component of the electronic device 105. For example, the output device 125 may be an LCD display, an LED display, an OLED display, a projector, or similar display device capable of outputting images, text, characters, and the like to a user. The output device 125 may display a user interface, such as a graphical user interface (GUI). In one embodiment, the user interface may include one or more windows.

In some embodiments, the output device 125 may be integrated with at least a portion of the input device 120. For example, the output device 125 and a touch panel of the input device 120 may be combined to form a touchscreen or similar touch-sensitive display. The output device 125 may receive data for display from the processor 110, the memory 115, and/or the password module 130.

The password module 130, in one embodiment, determines if a hotkey is pressed during a boot up process (e.g., during a boot cycle) and allows or denies access to the supervisor password based on whether the hot key was pressed during the boot up process. Pressing a hotkey requires physical presence of a user, such as a system administrator. Requiring physical presence of the user provides security to the electronic device 105, for example, by preventing attacker from using an automated script to set a random supervisor password thereby preventing the owner/user of the electronic device 105 from being able to access the BIOS, UEFI, or similar firmware interface.

In one embodiment, the password module 130 monitors for a key press of a hotkey during a boot up process, detects a supervisor password access attempt, allows access to the supervisor password in response to the hotkey being pressed during the boot up process, and denies access to the supervisor password in response to the hotkey not being pressed during the boot up process.

In certain embodiments, the password module 130 may determine whether the hotkey is pressed during the boot up process by changing a value of a protection flag and/or activating a deployment mode in response to detecting a key press of the hotkey during the boot up process. In some embodiments, the password module 130 may initiate a timer in response to a power-up event (e.g., initiation of the boot up process), monitor for a key press of the hotkey while the timer is active, and ignore key press of the hotkey after expiration of the timer.

The hotkey may be any key or combination of keys on the input device 120. In certain embodiments, the hotkey may be associated with accessing a boot menu, or BIOS/UEFI set up utility. For example, hotkey may be a function key such as the "F1" key, the "F8" key, and the "F12" key. In one embodiment, to press the hotkey, a user must simultaneously press two or more keys. In another embodiment, to press the hotkey, a user must press two or more keys in sequence.

Embodiments of the password module 130 are described in further detail below. In some embodiments, the password module 130 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

Figure 2:
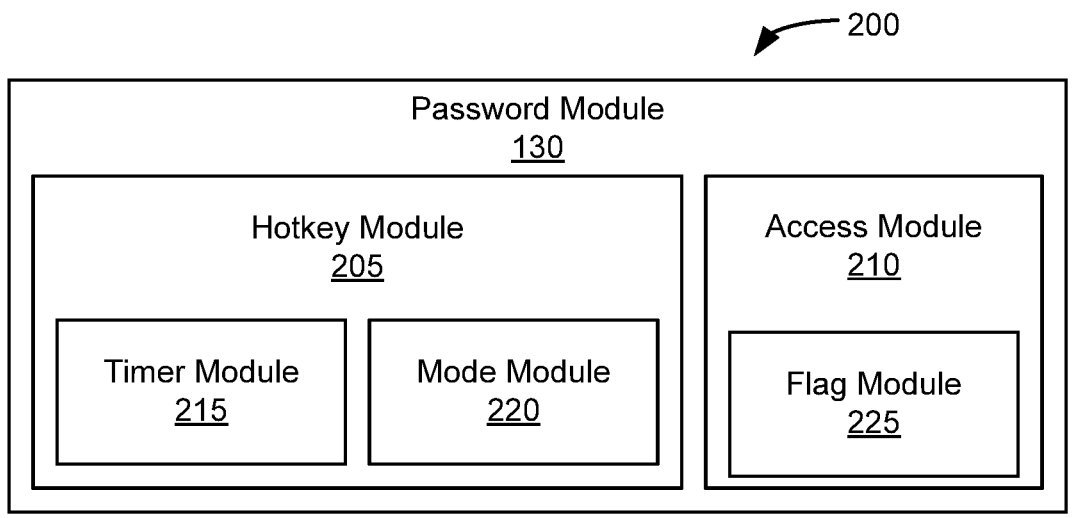
FIG. 2 is a schematic block diagram illustrating one embodiment of an apparatus for securely setting supervisor password during automated deployment.

FIG. 2 is a schematic block diagram illustrating an apparatus 200 for securely setting supervisor password during automated deployment. The apparatus 200 includes a password module 130, which may be one embodiment of the password module 130 described above with reference to FIG. 1. The password module 130 includes a hotkey module 205 and an access module 210. As depicted, the password module 130 may also include one or more of: a timer module 215, a mode module 220, and a flag module 225. The modules 205-225 may be communicatively coupled to one another.

The hotkey module 205, in one embodiment, is configured to monitor for and detect a key press of a hotkey during a boot process of the electronic device 105. As used herein, a hotkey refers to a specific key or combination of keys of the input device 120 to be pressed by a user. In certain embodiments, the hotkey module 205 detects a key press of the hotkey based on inputs from the input device 120 and/or the processor 110. The hotkey module 205 may comprise hardware circuits, program code operating on a processing device, or a combination of hardware circuitry and program code.

By detecting a key press of the hotkey during the boot process of the electronic device 105, the hotkey module 205 detects user presence at the electronic device 105 during the boot up process. Accordingly, detecting the key press of the hotkey proves to the password module 130 to that a user is physically present. Detecting the key press of the hotkey may also imply intent of the physically present user to access the supervisor password, as described below.

In certain embodiments, the hotkey module 205 sets the timer in response to a boot event and/or in response to detecting the hotkey press. Additionally, the hotkey module 205 may activate a deployment mode in response to detecting the hotkey press. As depicted, the hotkey module 205 may include a timer module 215 and/or a mode module 220. The timer module 215 may initiate a timer in response to a power-up event, wherein the hotkey module 205 monitors for a key press of the hotkey while the timers active. The mode module 220 may activate a deployment mode in response to the hotkey module 205 detecting a key press of the hotkey during the boot up process. The timer module 215 and the mode module 220 discussed in further detail below.

The access module 210, in one embodiment, is configured to monitor for and detect attempts to access a supervisor password. As used herein, accessing a supervisor password refers to a user or automated script attempting to set, reset, modify, and/or clear a supervisor password for the electronic device 105. In certain embodiments, the access module 210 detects attempts to access the supervisor password based on inputs from the input device 120, the network interface 135, and/or the processor 110. The access module 210 may comprise hardware circuits, program code operating on a processing device, or a combination of hardware circuitry and program code.

In some embodiments, the access module 210 monitors for attempts to access a supervisor password via a firmware interface, such as a BIOS or UEFI utility. For example, a BIOS utility may include an option for setting/changing the supervisor password, wherein the access module 210 monitors for attempts to set/change the supervisor password via the BIOS utility. In other embodiments, the access module 210 monitors for attempts to access the supervisor password via an operating system. For example, a Windows™ operating system may include a utility for setting/changing the supervisor password, wherein the access module 210 monitors for attempts to set/change the supervisor password via the operating system utility.

In some embodiments, the access module 210 controls access to the supervisor password based on input from the hotkey module 205. In one embodiment, the hotkey module 205 may send a control signal to the access module 210 in response to detecting a key press of the hotkey during the boot up process. The access module 210 may allow access to the supervisor password if it is received set control signal from the hotkey module 205 at the time detects an attempt to access the supervisor password. Otherwise, the access module 210 may deny access to the supervisor password if it has not received said control signal from the hotkey module.

In another embodiment, the access module 210 may query the hotkey module 205 in response to detecting an attempt to access the supervisor password. The access module 210 query whether a hotkey was pressed during the boot up process. If the hotkey module 205 response indicates that the hotkey was indeed pressed during the boot up process, then the access module 210 allows access to the supervisor password. Otherwise, if the hotkey module 205 response indicates that the hotkey was not pressed during the boot process, then the access module 210 denies access to the supervisor password.

In some embodiments, the access module 210 controls access to the supervisor password based on a startup mode of the electronic device 105. The access module 210 may identify the startup mode in response to detecting an attempt to access the supervisor password. As discussed above, the mode module 220 activates a deployment mode (e.g., causes the electronic device 105 to enter the deployment mode) in response to the hotkey module 205 detecting a key press of the hotkey during the boot up process. The access module 210 may identify the startup mode of the electronic device 105.

In certain embodiments, the access module 210 determines whether the electronic device 105 is in the deployment mode in response to detecting the attempt to access the supervisor password. In response to the deployment mode being activated (e.g., the electronic device 105 being in the deployment mode), the access module 210 may permit (e.g., allow) access to the supervisor password. Otherwise, in response to the electronic device 105 not being in the deployment mode, then the access module 210 may prevent (e.g., deny) access to the supervisor password. While in the deployment mode, the access module 210 may allow an automated script to set, reset, modify, and/or clear the supervisor password.

In some embodiments, the access module 210 controls access to the supervisor password based on a protection flag setting. The access module 210 may include a flag module 225 that sets a protection flag in response to a power-up (e.g., startup) event. For example, when the electronic device 105 is powered on and its hardware is initialized, the flag module 225 sets the protection flag. The protection flag may be a bit storing a single value (e.g., binary value). When the protection flag is set, the value stored in the bit indicates that the supervisor password is protected from access (e.g., of the supervisor password is an accessible).

In certain embodiments, the hotkey module 205 is configured to reset the protection flag in response to the hotkey being pressed during the boot up process. In other embodiments, the flag module 225 receives a control signal from the hotkey module 205 in response to the hotkey being pressed during the boot up process, the control signal indicating that the flag module 225 is to reset the protection flag. When the protection flag is reset, the value stored in the bit indicates that the supervisor password is accessible.

The flag module 225 may comprise hardware circuits, program code operating on a processing device, or a combination of hardware circuitry and program code. As depicted, the flag module 225 may be a component of the hotkey module 205. For example, the flag module 225 may be a hardware component of the hotkey module 205. As another example, the flag module 225 may be a subroutine of the hotkey module 205. However, in other embodiments the flag module 225 may be an independent component communicatively coupled to the hotkey module 205.

The access module 210 may read the value of the protection flag in response to detecting a supervisor password access attempt. In response to the access module 210 determining that the protection flag is set, then the access module 210 prevents (e.g., denies) access to the supervisor password. Otherwise, in response to the access module 210 determining that the protection flag is reset, then the access module 210 permits (e.g., allows) access to the supervisor password. Allowing access to the supervisor password enables a user and/or automated script to set, reset, modify, and/or clear the supervisor password.

The timer module 215, in one embodiment, initiates the timer in response to detecting a power-up event. As used herein, a power-up event refers to an event where the electronic device 105 is powered on (e.g., from an unpowered state) and initializes its hardware, for example, in order to boot. Examples of a power-up event include, but are not limited to, the start of the boot up process, a power-on self-test ("POST"), hardware initialization from an unpowered state, boot disk access, and loading a boot process into memory. Accordingly, by detecting the power up event, the timer module 215 identifies that the electronic device 105 is beginning a boot up (startup) phase.

In some embodiments, the timer module 215 may initiate a second timer in response to the hotkey module 205 detecting a key press of the hotkey. The second timer may have the same time value or a different time value as the first timer. The second timer aids the access module 210 in controlling access to the supervisor password by ensuring that the supervisor password access attempt is within a predetermined amount of time from the key press of the hotkey.

The timer module 215 monitors the timer. In some embodiments, the timer module 215 sends an output signal to the hotkey module 205 and/or the access module 210 in response to expiration of the timer. While the timer is active (e.g., before the timer expires), certain activities are permitted by the hotkey module 205 and/or the access module 210. For example, while the timer is active, the hotkey module 205 may monitor for a key press of the hotkey. If the hotkey is pressed while the timer is active (e.g., before the timer expires), then the hotkey module 205 may detect and record the key press. Otherwise, if the hotkey is pressed after expiration of the timer, then the hotkey module 205 may ignore the key press. Accordingly, the hotkey module 205 may monitor for a key press of the hotkey during a specific time frame measured by the timer module 215.

As another example, while the second timer is active, the access module 210 may monitor for an attempt to access the supervisor password. If the supervisor password access attempt occurs while the second timer is active, then the access module 210 may permit access to the supervisor password. Otherwise, if the supervisor password access attempt occurs after expiration of the second timer, then the access module 210 may ignore (e.g., deny) access to the supervisor password. Accordingly, the timer module 215 allows the access module 2102 control access to the supervisor password based on a time of the access attempt, as well as based on whether the hotkey was pressed during the startup process, whether the electronic device 105 is in a deployment mode, and/or whether a protection flag is set/reset.

The timer module 215 may comprise hardware circuits, program code operating on a processing device, or a combination of hardware circuitry and program code. As depicted, the timer module 215 may be a component of the hotkey module 205. For example, the timer module 215 may be a hardware component of the hotkey module 205. As another example, the timer module 215 may be a subroutine of the hotkey module 205. However, in other embodiments the timer module 215 may be an independent component communicatively coupled to the hotkey module 205.

The mode module 220, in one embodiment, activates a deployment mode in response to the hotkey module 205 detecting a key press of the hotkey during the boot up process. As used herein, activating a deployment mode refers to the mode module 220 causing the electronic device 105 to enter the deployment mode during the boot up process. In certain embodiments, the password module 130 permits an automated script to set, reset, modify, and/or clear the supervisor password in response to the electronic device 105 being in the deployment mode. In certain embodiments, the mode module 220 only activates the deployment mode if the key press of the hotkey is detected while a timer is active. For example, the timer module 215 may initiate a timer in response to a power-up event, wherein the mode module 220 does not activate the deployment mode if the hotkey is pressed after expiration of the timer.

The mode module 220 may comprise hardware circuits, program code operating on a processing device, or a combination of hardware circuitry and program code. As depicted, the mode module 220 may be a component of the hotkey module 205. For example, the mode module 220 may be a hardware component of the hotkey module 205. As another example, the mode module 220 may be a subroutine of the hotkey module 205. However, in other embodiments the mode module 220 may be an independent component communicatively coupled to the hotkey module 205.

Figure 3A:
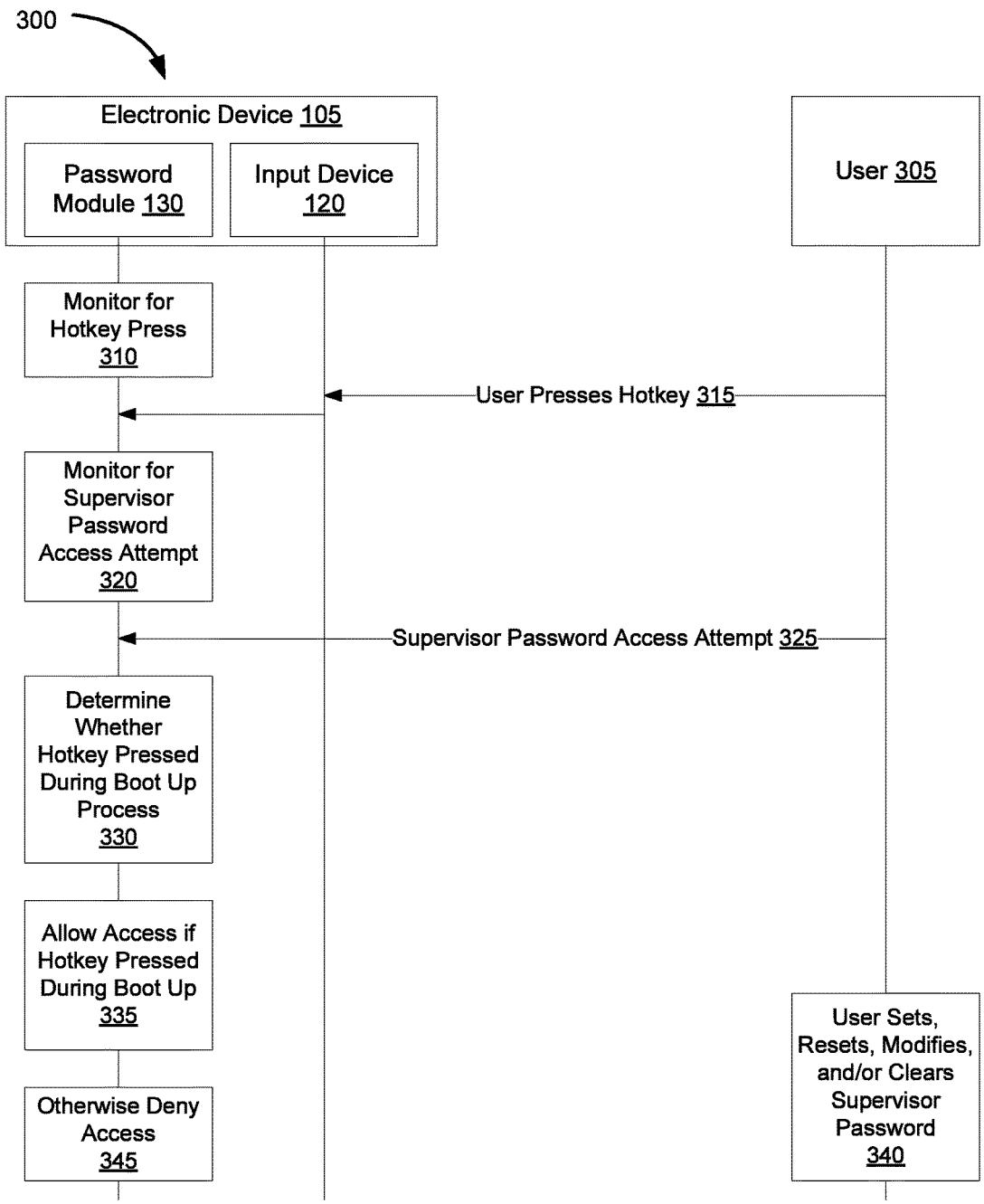
FIG. 3A is a block diagram illustrating one embodiment of securely setting supervisor password during automated deployment.
Figure 3B:
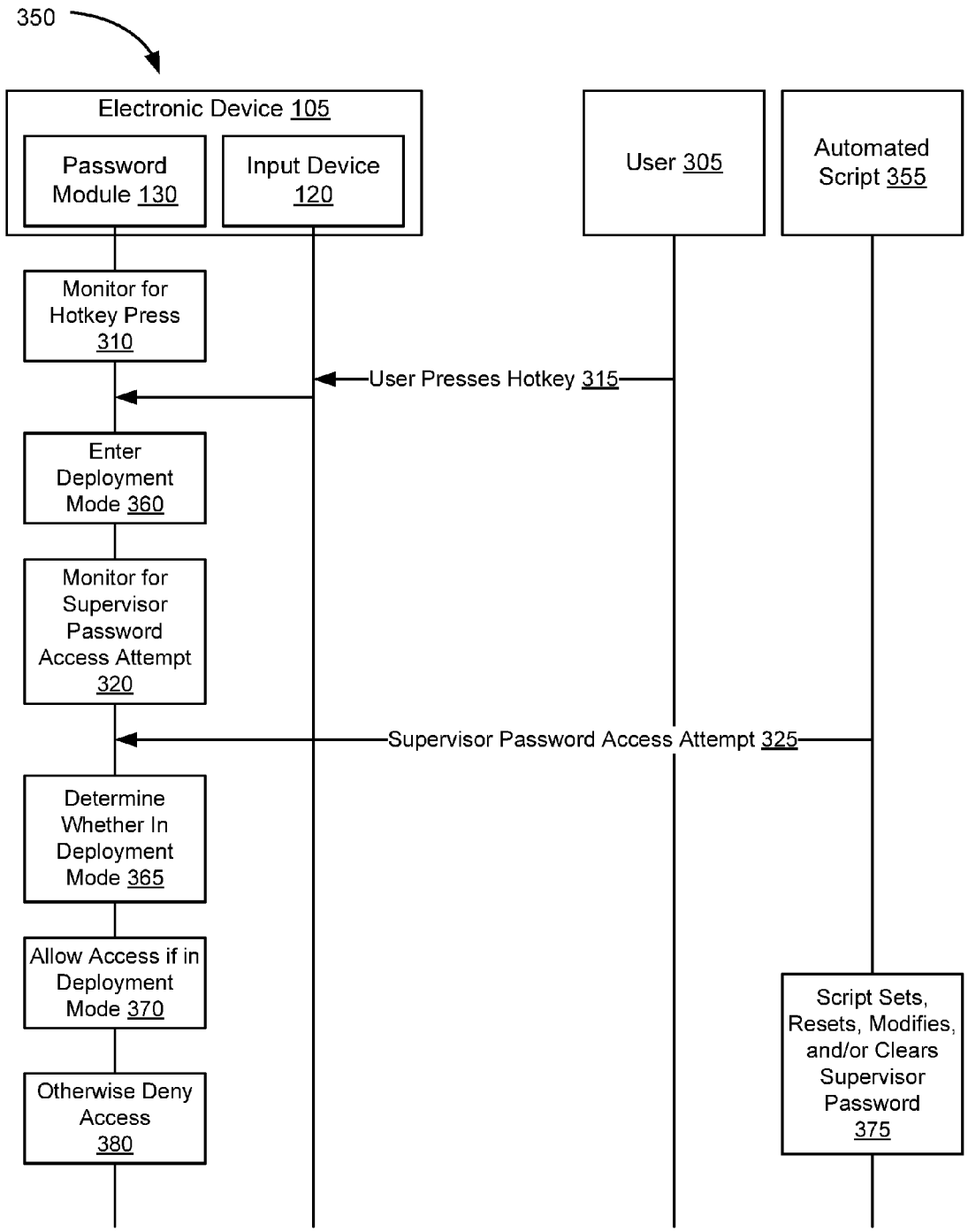
FIG. 3B is a block diagram illustrating another embodiment of securely setting supervisor password during automated deployment.

FIGS. 3A-3B are block diagrams illustrating securely setting a supervisor password during automated deployment. FIG. 3A depicts actions of an electronic device 105 and a user 305 as well as interactions between the electronic device 105 and the user 305. FIG. 3B depicts actions of the electronic device 105, the user 305, and an automated script 355, as well as interactions between the electronic device 105, user 305, and automated script 355.

The electronic device 105 may be an embodiment of the electronic device 105 discussed above with reference to FIGS. 1 and 2. The electronic device 105 includes an input device 120 and a password module 130. The password module 130 may be an embodiment of the password module 130 discussed above with reference to FIGS. 1 and 2. The automated script 355 is part of an automated deployment process, for example an enterprise deployment process for deploying the electronic device 105.

FIG. 3A shows the password module 130 monitoring for a key press of a hotkey during a boot up process (block 310). In some embodiments, the password module 130 may monitor for the key press of the hotkey by setting a protection flag in response to a power-up event, such as the beginning of a boot process of the electronic device 105. The protection flag may be a binary value stored in memory used to permit/deny access to a supervisor password.

In certain embodiments, the password module 130 initiates a timer in response to detecting a power-up event, such as the beginning of a boot process of the electronic device 105, wherein the password module 130 monitors for the key press of the hotkey only while timer is active. In one embodiment, the timer may be set so as to coincide with the length of the boot process of the electronic device 105. In other embodiments, the timer may be set to a shorter duration than the full the process of the electronic device 105.

At some point during the boot up process, the user 305 presses the hotkey (arrow 315). In some embodiments, the hotkey is a specific key of the input device 120. In other embodiments, the hotkey is a specific combination of keys of the input device 120. Upon the user 305 physically pressing the key/keys of the input device 120, the input device 120 signals the password module 130, wherein the password module 130 determines that the hotkey is pressed during the boot up process.

The password module 130 monitors for an attempt to access the supervisor password (block 320). While FIG. 3A depicts blocks 310 and 320 as occurring sequentially, in other embodiments blocks 310 and 320 occur simultaneously. Thus, the password module 130 may concurrently monitor for a key press of the hotkey and for an attempt to access the supervisor password.

At some point, the user 305 attempts to access the supervisor password (arrow 325). In some embodiments, the user 305 attempts to access the supervisor password by interacting with the electronic device via the input device 120. In other embodiments, the user 305 may attempt to access the supervisor password by initiating an automated script. The password module 130 detects the attempt to access the supervisor password and determines whether the hotkey was pressed during the boot up process (block 330).

If the password module 130 confirms that the hotkey was pressed during the boot up process, then the password module 130 allows the attempt to access the supervisor password (block 335). Thereafter, the user 305 may set, reset, modify, and/or clear the supervisor password (block 340). In some embodiments, the user may set, reset, modify, and/or clear the supervisor password via the input device 120. In other embodiments, the user may set, reset, modify, and/or clear the supervisor password via the automated script. Otherwise, if the password module 130 determines that the hotkey was not pressed during the boot up process, then the password module 130 denies the attempt to access the supervisor password (block 345). Accordingly, the depicted embodiments save time and effort of setting, resetting, modifying, and/or clearing the supervisor password without degrading security.

FIG. 3B similarly shows the password module 130 monitoring for a key press of a hotkey during a boot up process (block 310). In some embodiments, the password module 130 initiates a timer in response to detecting a power-up event, such as the beginning of a boot process of the electronic device 105, wherein the password module 130 monitors for the key press of the hotkey only while timer is active. In one embodiment, the timer may be set so as to coincide with the length of the boot up process of the electronic device 105. In other embodiments, the timer may be set to a shorter duration than the full the process of the electronic device 105.

At some point during the boot up process, the user 305 presses the hotkey (arrow 315). Note that the hotkey press must be received via the input device 120. The hotkey press indicates that the user 305 is physically present at/near the electronic device 105. Accordingly, the automated script 355 cannot press the hotkey and the password module 130 will input from the automated script 335 signaling a key press of the hotkey. Since the key press of the hotkey is only effective during the boot up process, the hotkey press signals physical presence of the user 305 and intent to set, reset, modify, and/or clear the supervisor password.

Upon the user 305 physically pressing the key/keys of the input device 120, the input device 120 signals the password module 130, wherein the password module 130 enters a deployment mode (block 360). The password module 130 enters the deployment mode only in response to the hotkey being pressed during the boot up process, otherwise, the electronic device 105 stays in a normal boot mode. While in the deployment mode, the password module 130 temporarily relaxes security measures for the supervisor password. Additionally, while in the deployment mode, the password module 130 allows automated scripts used within a deployment process, such as System Center Configuration Manager ("SCCM") or other system management software, to set, reset, modify, and/or clear the supervisor password.

The password module 130 monitors for an attempt to access the supervisor password (block 320). While FIG. 3A depicts blocks 310 and 320 as occurring sequentially, in other embodiments blocks 310 and 320 occur simultaneously. Thus, the password module 130 may concurrently monitor for a key press of the hotkey and for an attempt to access the supervisor password.

At some point, the automated script 355 attempts to access the supervisor password (arrow 325). In some embodiments, the user 305 initiates the automated script 355, which attends to access the supervisor password during a deployment process. The password module 130 detects the attempt to access the supervisor password and determines whether the electronic device 105 is in the deployment mode (block 365).

If the password module 130 confirms that the electronic device 105 is in the deployment mode, then the password module 130 allows the attempt to access the supervisor password (block 370). Thereafter, the automated script 355 may set, reset, modify, and/or clear the supervisor password (block 375). Otherwise, if the password module 130 determines that the electronic device 105 is not in the deployment mode, then the password module 130 denies the attempt by the automated script 355 to access the supervisor password (block 380). Accordingly, the depicted embodiments save time and effort of setting, resetting, modifying, and/or clearing the supervisor password without degrading security.

Figure 4:
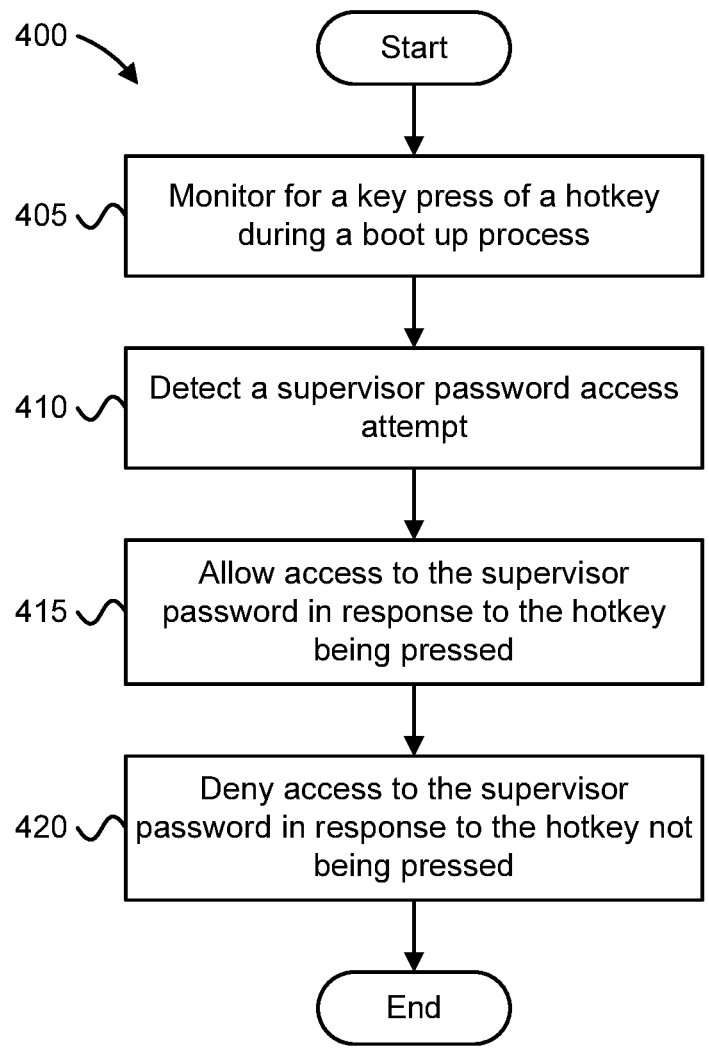
FIG. 4 is a schematic flow chart diagram illustrating one embodiment of a method for securely setting supervisor password during automated deployment.

FIG. 4 is a schematic flow chart diagram illustrating a method 400 for securely setting a supervisor password during automated deployment, according to embodiments of the disclosure. In one embodiment, the method 400 is performed by the electronic device 105. In another embodiment, the method 400 may be performed by the apparatus 200. Alternatively, the method 400 may be performed by a processor 110 and a computer readable storage medium, such as the memory 115. The computer readable storage medium may store code that is executed on the processor 110 to perform the functions of the method 400.

The method 400 begins and monitors 405 for a key press of a hotkey during a boot up process. In one embodiment, the hotkey module 205 monitors 405 for a key press of the hotkey during the boot up process. The hotkey may be a specific key and/or a specific combination of keys of the input device 120. In some embodiments, monitoring 405 for the key press of the hotkey during the boot up process includes monitoring key presses of the input device 120 during the boot up process. In certain embodiments, monitoring 405 for a key press of the hotkey during the boot up process includes initiating a timer at the start of the boot up process, wherein a key press of the hotkey is ignored if it occurs after expiration of the timer.

The method 400 detects 410 a supervisor password access attempt. In one embodiment, the access module 210 detects 410 an attempt to access the supervisor password. In some embodiments, detecting 410 an attempt to access the supervisor password includes monitoring inputs from the input device 120, the network interface 135, and/or the processor 110. In certain embodiments, detecting 410 a supervisor password access attempt includes initiating a timer in response to a key press of the hotkey during the boot up process, and monitoring for attempts to access the supervisor password while the timer is active (e.g., before the timer expires).

The method 400 allows 415 access to the supervisor password in response to the hotkey being pressed during the boot up process. In one embodiment, the access module 210 allows 415 access to the supervisor password in response to the hotkey being pressed during the boot up process. In some embodiments, allowing 415 access to the supervisor password in response to the hotkey being pressed during the boot up process includes allowing a user and/or automated script to set, reset, modify, and/or clear the supervisor password.

In one embodiment, allowing 415 access to the supervisor password in response to the hotkey being pressed during the boot up process includes the access module 210 receiving an indication from the hotkey module 205 as to whether the hotkey was pressed during the boot up process. In another embodiment, allowing 415 access to the supervisor password includes determining whether a protection flag is reset, wherein the access module 210 allows 415 access to the supervisor password in response to the protection flag being reset. In yet another embodiment, allowing 415 access to the supervisor password includes determining whether a deployment mode is active, wherein the access module 210 allows 415 access to the supervisor password in response to the deployment mode being active.

The method 400 denies 420 access to the supervisor password in response to the hotkey not being pressed during the boot up process and the method 400 ends. In one embodiment, the access module 210 denies 420 access to the supervisor password in response to the hotkey not being pressed during the boot up process. In certain embodiments, denying 420 access to the supervisor password includes displaying a notification on the output device 125. For example, the password module 130 may control the output device 125 to display an error message or other message notifying the user that access to the supervisor password is denied. The error message may include a reason for denying 420 access to the supervisor password, such as the hotkey not being pressed during the boot up process.

In one embodiment, denying 420 access to the supervisor password in response to the hotkey not being pressed during the boot up process includes the access module 210 receiving an indication from the hotkey module 205 as to whether the hotkey was pressed during the boot up process. In another embodiment, denying 420 access to the supervisor password includes determining whether a protection flag is set, wherein the access module 210 denies 420 access to the supervisor password in response to the protection flag being set. In yet another embodiment, denying 420 access to the supervisor password includes determining whether a deployment mode is active, wherein the access module 210 denies 420 access to the supervisor password in response to the deployment mode not being active.

Figure 5:
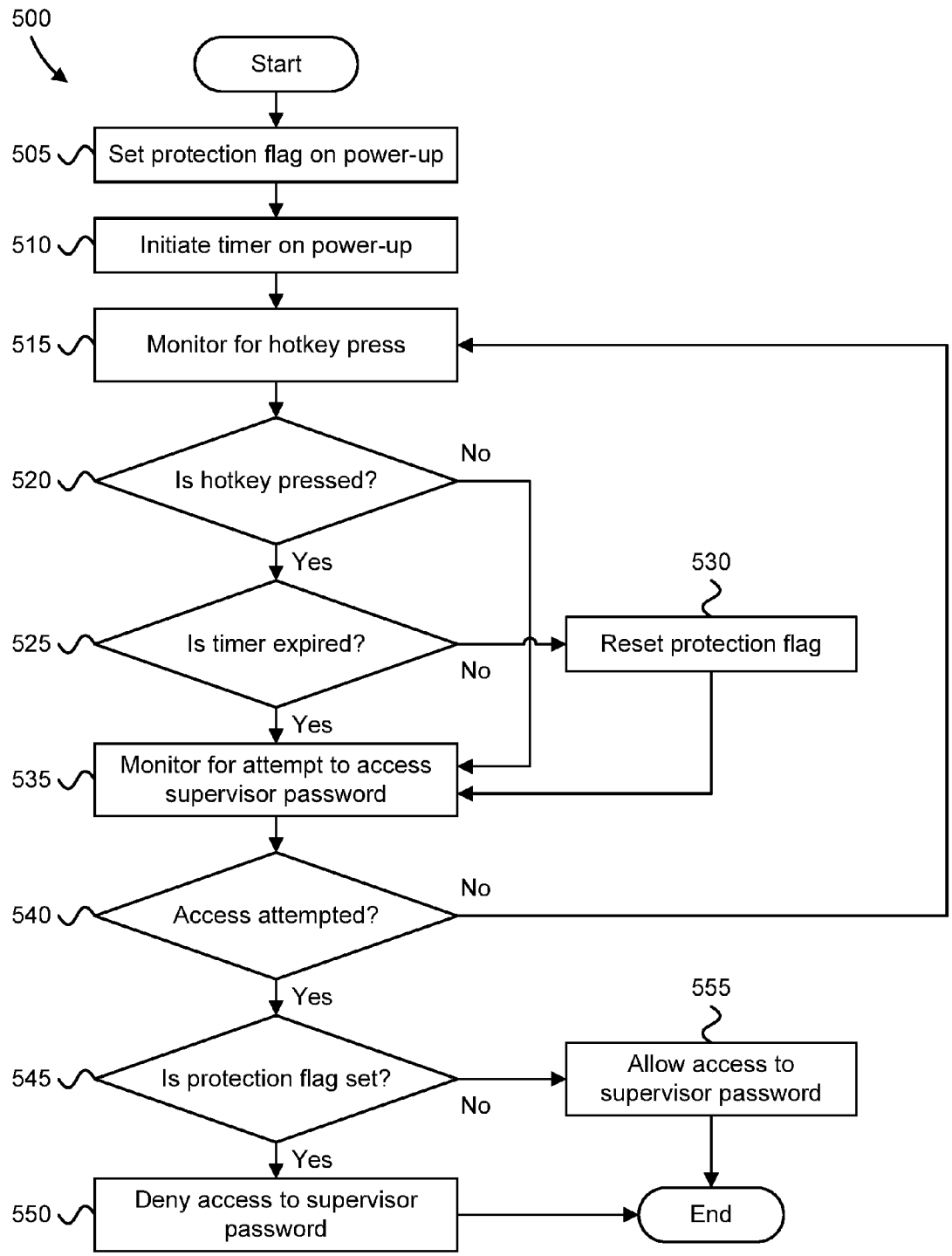
FIG. 5 is a schematic flow chart diagram illustrating another embodiment of a method for securely setting supervisor password during automated deployment.

FIG. 5 is a schematic flow chart diagram illustrating a method 500 for securely setting supervisor password during automated deployment, according to embodiments of the disclosure. In one embodiment, the method 500 is performed by the electronic device 105. In another embodiment, the method 500 may be performed by the apparatus 200. Alternatively, the method 500 may be performed by a processor 110 and a computer readable storage medium, such as the memory 115. The computer readable storage medium may store code that is executed on the processor 110 to perform the functions of the method 500.

The method 500 begins and sets 505 a protection flag on power-up (e.g., in response to a power-up event). In one embodiment, the flag module 225 sets 505 the protection flag in response to detecting a power-up event. In some embodiments, setting 505 the protection flag includes storing a binary value for a bit in memory 115 corresponding to the protection flag, wherein the stored value indicates that the protection flag is set. The method 500 initiates 510 a timer on power-up (e.g., in response to the power-up event). In one embodiment, the timer module 215 initiates 510 the timer in response to detecting the power-up event. In some embodiments, the timer is initiated for a value corresponding to a length of a boot up process of the electronic device 105.

The method 500 monitors 515 for a key press of a hotkey. In one embodiment, the hotkey module 205 monitors 515 for a key press of the hotkey. The hotkey may be a specific key of the input device 120 and/or a specific combination of keys of the input device 120. In some embodiments, monitoring 515 for the key press of the hotkey includes monitoring key presses of the input device 120 during the boot up process.

The method 500 determines 520 whether the hotkey is pressed. In one embodiment, the hotkey module 205 determines 520 whether the hotkey is pressed. In response to the hotkey being pressed, the method 500 determines 525 whether the timer is expired. Otherwise, in response to the hotkey not being pressed, the method 500 monitors 535 for an attempt to access a supervisor password.

In one embodiment, the timer module 215 and/or the hotkey module 205 determine 525 whether the timer is expired. In response to the timer not being expired (e.g., the timer being active), then the method 500 resets 530 the protection flag and monitors 535 for an attempt to access the supervisor password. In one embodiment, the hotkey module 205 and/or the flag module 225 resets 530 the protection flag. Otherwise, in response to the timer being expired, the method 500 monitors 535 for an attempt to access the supervisor password. In some embodiments, monitoring 535 for an attempt to access the supervisor password includes monitoring inputs from the input device 120, the network interface 135, and/or the processor 110.

In one embodiment, the access module 210 monitors 535 for an attempt to access the supervisor password. The method 500 then determines 540 whether access to the supervisor password is attempted. In one embodiment, the access module 210 determines 540 whether access to the supervisor password is attempted. In response to determining that no access to the supervisor password is attempted, the method 500 again monitors 515 for a key press of the hotkey. Otherwise, in response to determining that access to the supervisor password is attempted, the method 500 determines 545 whether the protection flag is set. In one embodiment, the access module 210 determines 545 whether the protection flag is set.

In response to determining that the protection flag is set, the method 500 denies 550 access to the supervisor password. In one embodiment, the access module 210 denies 550 access to the supervisor password in response to determining that the protection flag is set. In some embodiments, denying 550 access to the supervisor password includes preventing a user and/or automatic script to set, reset, modify, and/or clear the supervisor password.

In certain embodiments, denying 550 access to the supervisor password includes displaying a notification on the output device 125. For example, the password module 130 may control the output device 125 to display an error message or other message notifying the user that access to the supervisor password is denied. The error message may include a reason for denying 550 access to the supervisor password, such as the protection flag being set.

Otherwise, in response to determining that the protection flag is reset, the method 500 allows 555 access to the supervisor password. In one embodiment, the access module 210 allows 555 access to the supervisor password in response to determining that the protection flag is reset. The method 500 ends. In some embodiments, allowing 555 access to the supervisor password in response to determining that the protection flag is reset includes allowing a user and/or automated script to set, reset, modify, and/or clear the supervisor password.

Figure 6:
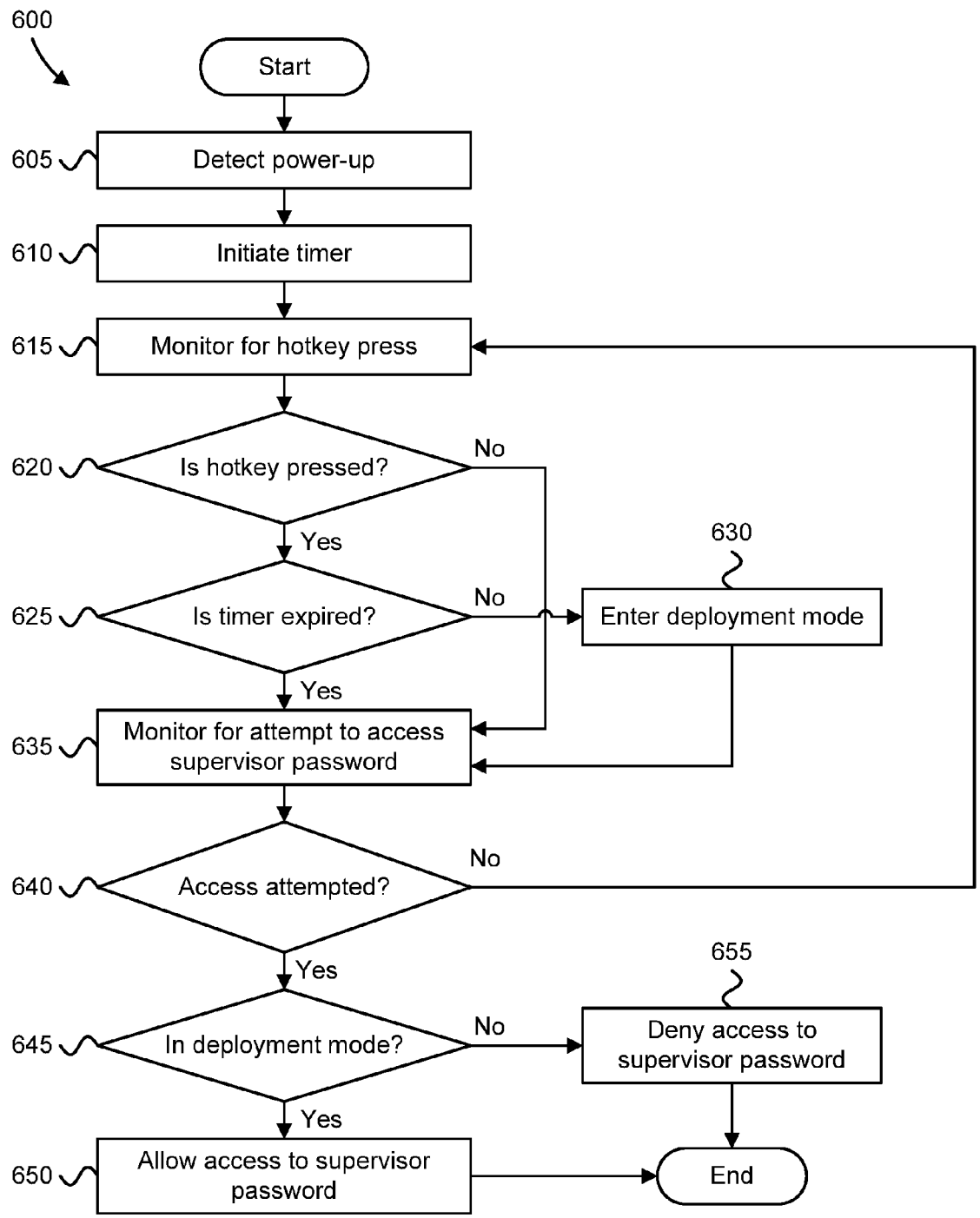
FIG. 6 is a schematic flow chart diagram illustrating another embodiment of a method for securely setting supervisor password during automated deployment.

FIG. 6 is a schematic flow chart diagram illustrating a method 600 for securely setting supervisor password during automated deployment, according to embodiments of the disclosure. In one embodiment, the method 600 is performed by the electronic device 105. In another embodiment, the method 600 may be performed by the apparatus 200. Alternatively, the method 600 may be performed by a processor 110 and a computer readable storage medium, such as the memory 115. The computer readable storage medium may store code that is executed on the processor 110 to perform the functions of the method 600.

The method 600 begins and detects 605 a power-up event. In one embodiment, the password module 130, the timer module 215, and/or the mode module 220 detects 605 the power up event. In some embodiments, the detecting 605 the power-up event includes detecting one or more of: the start of the boot up process, a power-on self-test ("POST"), a hardware initialization from an unpowered state, the accessing of a boot disk, and the loading a boot process into memory. The method 600 initiates 610 a timer (e.g., in response to the power-up event). In one embodiment, the timer module 215 initiates 610 the timer in response to detecting the power-up event. In some embodiments, the timer is initiated for a value corresponding to a length of a boot up process of the electronic device 105.

The method 600 monitors 615 for a key press of a hotkey. In one embodiment, the hotkey module 205 monitors 615 for a key press of the hotkey. The hotkey may be a specific key of the input device 120 and/or a specific combination of keys of the input device 120. In some embodiments, monitoring 615 for the key press of the hotkey includes monitoring key presses of the input device 120 during the boot up process.

The method 600 determines 620 whether the hotkey is pressed. In one embodiment, the hotkey module 205 determines 620 whether the hotkey is pressed. In response to the hotkey being pressed, the method 600 determines 625 whether the timer is expired. Otherwise, in response to the hotkey not being pressed, the method 600 monitors 635 for an attempt to access a supervisor password.

In one embodiment, the timer module 215 and/or the hotkey module 205 determine 625 whether the timer is expired. In response to the timer not being expired (e.g., the timer being active), then the method 600 enters 630 a deployment mode and monitors 635 for an attempt to access the supervisor password. In one embodiment, the hotkey module 205 and/or the mode module 220 enters 630 the deployment mode. In certain embodiments, the deployment mode permits an automated script to set, reset, modify, and/or clear the supervisor password. In some embodiments, the electronic device 105 initiates into a normal boot mode, wherein the mode module 220 causes the electronic device 105 to enter a deployment mode in response to the hotkey being pressed before the timer expires.

Otherwise, in response to the timer being expired, the method 600 monitors 635 for an attempt to access the supervisor password. In some embodiments, monitoring 635 for an attempt to access the supervisor password includes monitoring inputs from the input device 120, the network interface 135, and/or the processor 110. In one embodiment, the access module 210 monitors 635 for an attempt to access the supervisor password.

The method 600 then determines 640 whether access to the supervisor password is attempted. In one embodiment, the access module 210 determines 640 whether access to the supervisor password is attempted. In response to determining that no access to the supervisor password is attempted, the method 600 again monitors 615 for a key press of the hotkey.

Otherwise, in response to determining that access to the supervisor password is attempted, the method 600 determines 645 whether the deployment mode is active. In one embodiment, the access module 210 determines 645 whether the deployment mode is active. In certain embodiments, determining 645 whether the deployment mode is active includes identifying a startup mode of the electronic device 105, wherein the electronic device 105 is in one of the deployment mode and a normal boot mode.

In response to determining that the deployment mode is active, the method 600 allows 650 access to the supervisor password. In one embodiment, the access module 210 allows 650 access to the supervisor password in response to determining that the deployment mode is active. In some embodiments, allowing 650 access to the supervisor password includes allowing automatic script to set, reset, modify, and/or clear the supervisor password due to the electronic device 105 being in the deployment mode.

Otherwise, in response to determining that the deployment mode is not active, the method 600 denies 655 access to the supervisor password. In one embodiment, the access module 210 denies 655 access to the supervisor password in response to determining that the deployment mode is not active. The method 600 ends. In some embodiments, denying 655 access to the supervisor password in response to determining that the protection flag is reset includes preventing a user and/or automated script to set, reset, modify, and/or clear the supervisor password.

In certain embodiments, denying 655 access to the supervisor password includes displaying a notification on the output device 125. For example, the password module 130 may control the output device 125 to display an error message or other message notifying the user that access to the supervisor password is denied. The error message may include a reason for denying 655 access to the supervisor password, such as the electronic device 105 not being in the deployment mode.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an input device that receives a key press from a user;
a processor; and
a memory that stores code executable by the processor to:
start a boot up process of the apparatus;
monitor for a key press of a hotkey during the boot up process;
enter a deployment mode in response to the hotkey being pressed during the boot up process, wherein the deployment mode is a boot mode that relaxes security measures for a supervisor password of the apparatus;
enter a normal boot mode in response to the hotkey not being pressed during the boot up process;
allow access to the supervisor password only in response to entering the deployment mode, wherein the allowing access to the supervisor password comprises permitting the automated script to perform, while in the deployment mode, one of: set the supervisor password, reset the supervisor password, modify the supervisor password, and clear the supervisor password; and
deny access to the supervisor password in response to entering the normal boot mode.

2. The apparatus of claim 1, wherein the memory further comprises code executable by the processor to:
set a protection flag in response to a power-up event; and
reset the protection flag in response to the hotkey being pressed during the boot up process.

3. The apparatus of claim 2, wherein the code executable by the processor to deny access to the supervisor password determines whether the protection flag is set and prevents access to the supervisor password in response to the protection flag being set.

4. The apparatus of claim 1, wherein the memory further comprises code executable by the processor to initiate a timer in response to a power-up event, wherein the code executable by the processor to monitor for a key press of the hotkey during a boot up process monitors for a hotkey press while the timer is active and ignores a hotkey press in response to expiration of the timer.

5. The apparatus of claim 1, wherein the hotkey press comprises at least two key presses.

6. The apparatus of claim 1, wherein the hotkey press comprises a user simultaneously pressing two or more keys.

7. A method comprising:
starting a boot process of an electronic device;
initiating a timer at the beginning of the boot process of the electronic device;
monitoring, by use of a processor, for a key press of a hotkey while the timer is active;
entering a deployment mode in response to the hotkey being pressed while the timer is active, wherein the deployment mode is a boot mode that relaxes security measures for a supervisor password of the apparatus;
allowing access to the supervisor password in response to entering the deployment mode, wherein the allowing access to the supervisor password comprises permitting an automated script to do one of: set the supervisor password, reset the supervisor password, modify the supervisor password, and clear the supervisor password; and
entering a normal boot mode in response to the hotkey not being pressed prior to expiration of the timer; and
denying access to the supervisor password in response to entering the normal boot mode.

8. The method of claim 7, further comprising:
setting a protection flag at the beginning of the boot process of the electronic device; and
toggling the protection flag in response to the hotkey being pressed while the timer is active.

9. The method of claim 8, wherein allowing access to the supervisor password in response to the hotkey being pressed during the boot process further comprises:
reading a value of the protection flag;
permitting access to the supervisor password in response to the protection flag being toggled; and
preventing access to the supervisor password in response to the protection flag not being toggled.

10. The method of claim 7, wherein monitoring for a key press of the hotkey during the boot up process comprises ignoring a hotkey press in response to expiration of the timer.

11. The method of claim 7, wherein the hotkey press comprises a user simultaneously pressing two or more keys.

12. A program product comprising a computer readable storage medium that stores code executable by a processor, the executable code comprising code to perform:
starting a boot up process of an electronic device in response to a power-up event;
initiating a timer in response to the power-up event;
monitoring for a key press of a hotkey while the timer is active;
entering a deployment mode in response to the hotkey being pressed while the timer is active, wherein the deployment mode is a boot mode that relaxes security measures for a supervisor password of the apparatus;
allowing access to the supervisor password in response to entering the deployment mode, wherein the allowing access to the supervisor password comprises permitting an automated script to do one of: set the supervisor password, reset the supervisor password, modify the supervisor password, and clear the supervisor password; and
entering a normal mode in response to the hotkey not being pressed prior to expiration of the timer; and
denying access to the supervisor password in response to entering the normal mode.

13. The program product of claim 12, wherein the executable code further comprises code to perform:
setting a protection flag in response to a power-up event; and
resetting the protection flag in response to the hotkey being pressed while the timer is active.

14. The program product of claim 13,
wherein allowing access to the supervisor password in response to the hotkey being pressed while the timer is active comprises permitting access to the supervisor password in response to the protection flag being reset and preventing access to the supervisor password in response to the protection flag being set.

15. The program product of claim 12,
wherein monitoring for a key press of a hotkey while the timer is active includes ignoring a press of the hotkey in response to expiration of the timer.

16. The program product of claim 12, wherein the hotkey press comprises a user simultaneously pressing two or more keys.

* * * * *